P. VON LIEVEN.
HOOK CONVEYING DEVICE.
APPLICATION FILED JULY 19, 1912.
1,187,114.
Patented June 13, 1916.
4 SHEETS—SHEET 1.
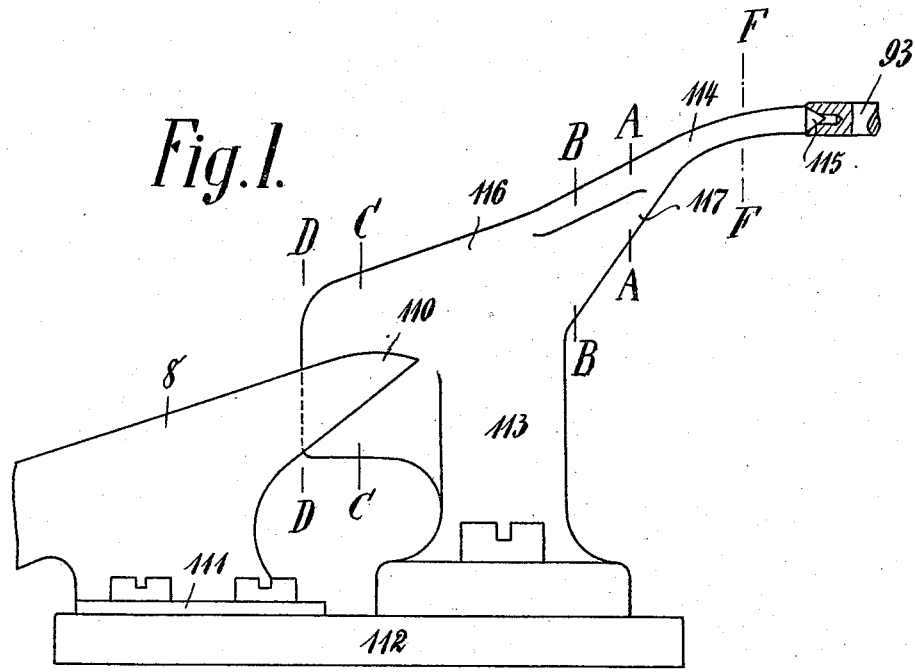
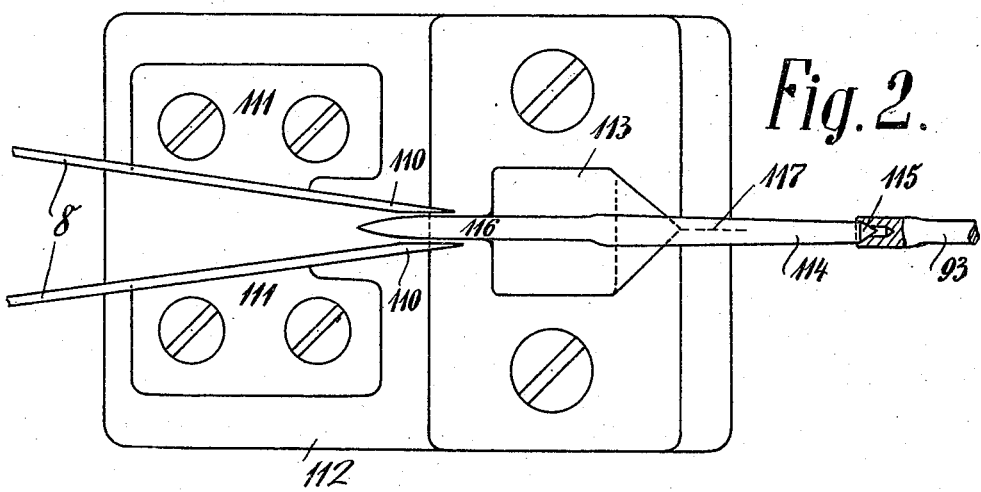
WITNESSES:
John C. Sanders
Albert F. Henman
INVENTOR:
Paul von Lieven
BY
ATTY.

P. VON LIEVEN.
HOOK CONVEYING DEVICE.
APPLICATION FILED JULY 19, 1912.
1,187,114.
Patented June 13, 1916.
4 SHEETS—SHEET 2.
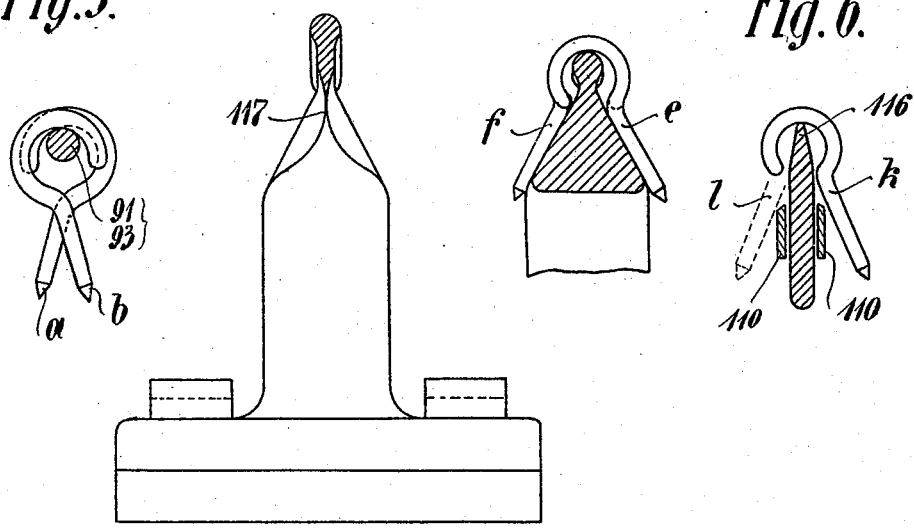
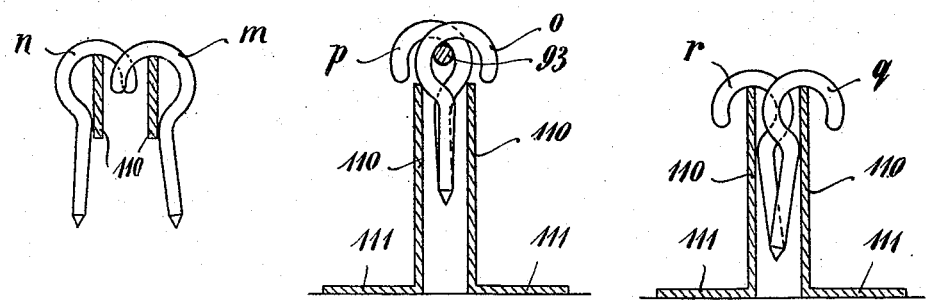
WITNESSES:
John C. Sanders
Albert F. Heuman
INVENTOR:
Paul von Lieven
BY McMillan White
ATTY.

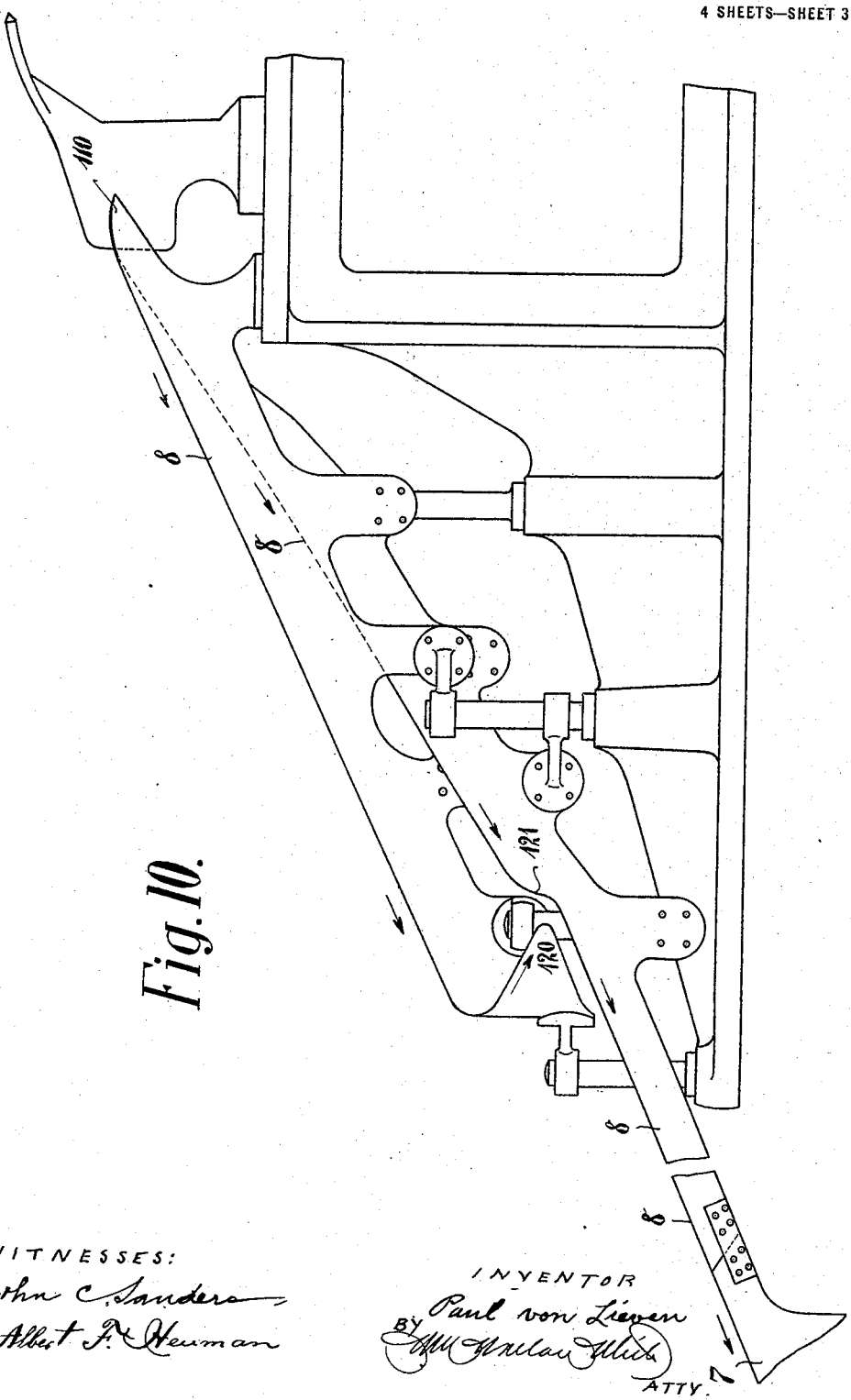

P. VON LIEVEN.
HOOK CONVEYING DEVICE.
APPLICATION FILED JULY 19, 1912.
1,187,114.
Patented June 13, 1916.
4 SHEETS—SHEET 4.
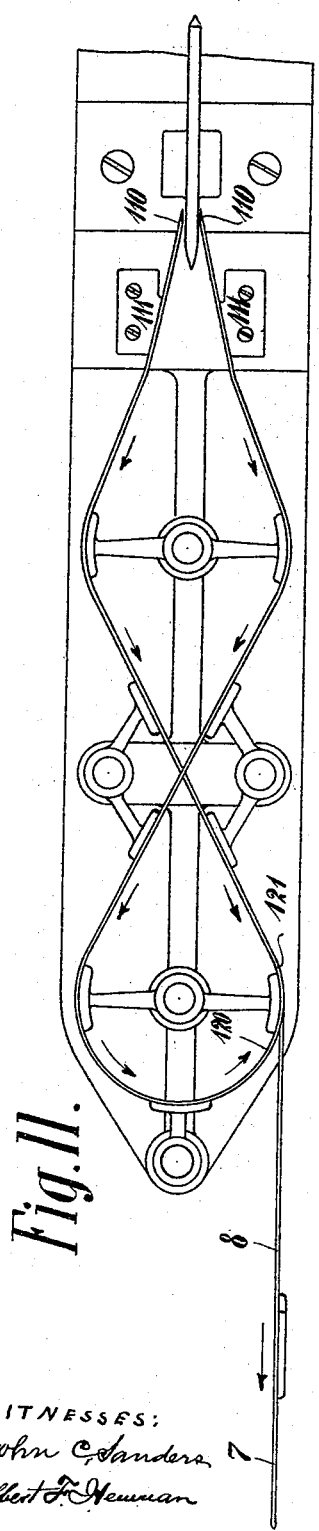
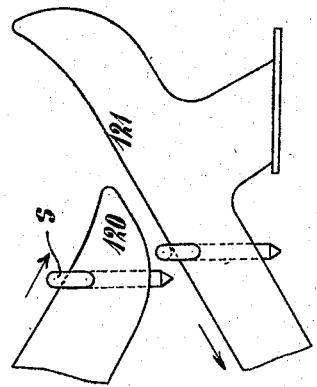
WITNESSES:
John C. Sanders
Albert F. Newman
INVENTOR:
Paul von Lieven
BY
ATTY.

UNITED STATES PATENT OFFICE.

PAUL VON LIEVEN, OF LÜBECK, GERMANY.

HOOK-CONVEYING DEVICE.

1,187,114.  Specification of Letters Patent.  Patented June 13, 1916.

Application filed July 19, 1912. Serial No. 710,434.

*To all whom it may concern:*

Be it known that I, PAUL VON LIEVEN, a subject of the Emperor of Russia, residing at Lübeck, Germany, have invented certain new and useful Improvements in Hook-Conveying Devices, of which the following is a specification.

The invention relates to means for conveying hooks and the like from one place to another as for instance in feeding hooks to a machine in which the hooks are subjected to a further process or treatment or for directly utilizing the hooks.

Regardless of the purpose for which the hooks or the like are employed it is frequently necessary to arrange the same in a predetermined position prior to their arrival at their destination that is to say with all of the points of the hooks facing the same general direction, and the present invention has for its object to provide improved means whereby this result may be achieved.

In the accompanying drawings several forms of the improved device for carrying the invention into practice are illustrated, the different forms of the invention illustrated constituting what are at present believed to be the best embodiments thereof.

Figure 1 is a view in elevation of a hook conveying and sorting device arranged in accordance with this invention, Fig. 2 being a plan view of the device shown in Fig. 1. Figs. 3 to 7 are detail views on the lines F—F, A—A, B—B, C—C and D—D, of Fig. 1 respectively. Figs. 8 and 9 are detail views in sectional elevation illustrating modifications of the invention. Figs. 10 and 11 are views in elevation and a plan view respectively showing a further modification in the form of the conveying and sorting device constructed in accordance with the invention, Fig. 12 being a detail view of a portion of the device shown in Fig. 10.

In the construction shown in Figs. 1 to 7 the body portion 113 of the conveying device is shown mounted on a base plate 112, and adjacent to the portion 113 of the device two guides or guide rails 8 are provided rigidly attached to the base plate 112 by means of screws passing through attaching portions 111 and having longitudinally extending projections 110 arranged on each side of the body portion 113. The portion 113 terminates at the top in a horn-shaped projection 114 slanting upward relatively to the base plate of the device, the opposite end of the body portion 113 to that on which the horn-shaped member 114 is formed being constituted by a wedge-shaped ridge 116 constituting a guiding rail for the hooks conveyed from the horn-shaped member 114 as will be hereinafter explained.

One method of placing the hooks upon the horn-shaped member 114 consists in utilizing a special rod or carrier 93 for the purpose, upon which the hooks are placed with their points facing in either direction, the carrier being provided with an indentation or cavity into which when the hooks are being transferred to the horn-shaped member, the pointed extremity 115 of the horn-shaped member projects and so retains the carrier in the desired correct position when the carrier is tilted upwardly so as to cause the hooks to pass into and over the device by the action of gravity. However, any other suitable means for loading the device may be employed if desired.

When the hooks pass from the horn-shaped member 114 to the upper edge 116 of the device they are moved from the crossed position $a$, $b$ as shown in Fig. 3 to the position $e$, $f$ shown in Fig. 5, that is to say the shanks of the hooks are automatically moved to a position in which the shanks of the hooks on one side of the guide are arranged at an angle of approximately 75° relatively to those on the opposite side. This is effected by means of the narrow portion 117 on the underside and adjacent to the top of the body portion 113, said body being gradually enlarged toward the discharge end thereof for a portion of its length to form wings on opposite sides of the body portion as is clearly shown in Figs. 2, 4 and 5 of the drawings. The cross-sectional views on the lines A—A and B—B respectively (see Figs. 4 and 5) show this clearly. Fig. 6, which is a sectional view on the line C—C of Fig. 1 shows the hooks on the upper edge of the conveying device still in the open position that is with the shanks of the hooks held outwardly with their outwardly turned points above the projections 110 of the guides 8 branching off at an acute angle from the extremity 116 of the main guide or rail. The hooks remain in this position until they reach the end of the guide 116 whereupon they drop onto the guides 110, those hooks the shanks of which are turned to the right dropping upon one rail or guide and those hooks with their shanks turned to the left dropping upon the other rail and passing by the action of gravity to their destination. Fig. 7 shows the position of the hooks after they have dropped from the main guide, m designating a hook hanging on the right hand side rail and n that hanging on the left hand side rail.

Instead of separating the shanks of the hooks as described with reference to Figs. 1 to 7 their points may be moved to the correct position for dropping upon the rails or guides 8 by guiding the shanks into the same general plane and so altering the position of the curved portion of the hooks relatively to the rails or guides 8 upon which it is desired that they shall drop and travel. An arrangement of this description is shown in Figs. 8 and 9. The crossed shanks of the hooks depending downwardly from the carrier 93 or its equivalent in cases in which the carrier 93 is dispensed with and superseded by other means are caught and held together between extensions on the projections 110 of the guide rails which approach each other prior to that point being reached at which the hooks drop on to the guide rails 8 so that the hooks r, q when dropping fall directly upon the rail located on that side of the hook on which the point of the hook projects.

In the arrangement shown in Figs. 10 to 12 the conveying and arranging device is so constructed as to arrange all of the hooks with their points facing in the same general direction upon a single rail instead of upon two rails, the rail 8 being curved and projecting above the other guide 121. The rail 8 terminates in a tongue or projection 120 which is located slightly above the other rail 121 so that the hooks s fall from the portion 120 of the rail 8 directly on to the rail 121.

I claim as my invention.—

1. In a hook conveying device, a main guide and subsidiary guides branching therefrom in such relation thereto that hooks facing in one direction on the main guide will be transferred to one of the subsidiary guides and hooks facing in the other direction on the main guide will be transferred to another of said subsidiary guides.

2. In a hook conveying device, a main guide and a subsidiary guide, said subsidiary guide being adapted for separating certain of the hooks from the remainder by the action of gravity in passing from said main guide to said subsidiary guide, said main guide being so formed as to alter the relative positions of the hooks prior to such separation and being located in close proximity to the subsidiary guide so as to discharge the hooks thereon.

3. In a hook conveying device, a main guide for accommodating the hooks, and two subsidiary guides branching therefrom, said main guide being so formed as to alter the relative positions of the hooks prior to their delivery to the subsidiary guides.

4. In a hook conveying device, an inclined main guide, means for conveying hooks to said guide, and inclined subsidiary guides branching from said main guide in such relation thereto that hooks facing in one direction on the main guide will be transferred to one of the subsidiary guides and hooks facing in the other direction on the main guide will be transferred to another of said subsidiary guides, said guides being adapted to feed the hooks by gravity.

5. In a hook conveying device, a main guide and subsidiary guides branching therefrom in such relation thereto that hooks facing in one direction on the main guide will be transferred to one of the subsidiary guides and hooks facing in the other direction on the main guide will be transferred to another of said subsidiary guides, one of said subsidiary guides being so located relative to the other subsidiary guide as to cause the hooks thereon to travel in a reverse direction to the direction of travel of the hooks on the other subsidiary guide and to be deposited thereon with all the hooks facing in the same direction.

6. In a hook conveying device, a main guide and subsidiary guides branching therefrom in such relation thereto that hooks facing in one direction on the main guide will be transferred to one of the subsidiary guides and hooks facing in the other direction on the main guide will be transferred to another of said subsidiary guides, one of said subsidiary guides being disposed across the other subsidiary guide and disposed in a reverse direction to extend over the last mentioned subsidiary guide whereby to cause the hooks thereon to be deposited on to the second named subsidiary guide whereby to cause all of the hooks to face in the same direction.

7. In a hook conveying device, a main guide on which the hooks are arranged to be conveyed from one point to another by the action of gravity, means coupled thereto for feeding hooks thereon, and a subsidiary guide branching from the main guide in such relation thereto that hooks located in certain positions will be separated from the hooks located in other positions and means to receive the other hooks from the main guide.

8. In a hook conveying device, a wedge-shaped ridge forming a guide rail, a body portion therefor suitably supported, a slanting horn-shaped projection extending from said ridge, a rod coupled to said projection for feeding the hooks thereon, said body portion near its upper part being provided with side extensions gradually enlarged toward the discharge end thereof, and rails leading from opposite sides of the ridge and spaced therefrom as and for the purpose described.

9. In a hook conveying device, a wedge-shaped ridge forming a guide rail, a body portion therefor suitably supported, a slanting horn-shaped projection extending from said ridge, a rod coupled to said projection for feeding the hooks thereon, and rails leading from opposite sides of the ridge whereby hooks mounted on the ridge and facing in different directions will be caused to group together upon the separate rails upon which said hooks are passed from the ridge, with the hooks upon corresponding rails extending in the same direction, substantially as described.

10. In a hook conveying device, a wedge-shaped ridge forming a guide rail, a body portion therefor suitably supported, a slanting horn-shaped projection extending from said ridge, a rod coupled to said projection for feeding the hooks thereon, and rails leading from opposite sides of the ridge whereby hooks mounted on the ridge and facing in different directions will be caused to group together upon the separate rails upon which said hooks are passed from the ridge, with the hooks upon corresponding rails extending in the same direction, one of said rails crossing over the other and being curved in a reversed direction to extend over the other rail, said first-mentioned rail terminating in a tongue spaced above the second-named rail whereby the hooks will be discharged therefrom to extend in the same direction as the hooks initially discharged on said second-named rail.

In testimony whereof I have hereunto set my hand in presence of two subscribing witnesses.

PAUL von LIEVEN.

Copies of this patent may be obtained for five cents each, by addressing the "Commissioner of Patents, Washington, D. C."